March 7, 1950 W. P. BOOTHROYD 2,499,844

RECEIVER FOR PULSE-POSITION-MODULATION SYSTEMS

Filed Jan. 16, 1947 3 Sheets-Sheet 1

INVENTOR.
WILSON P. BOOTHROYD
BY
Brown, Denk & Synnestvedt
AGENTS

March 7, 1950 W. P. BOOTHROYD 2,499,844

RECEIVER FOR PULSE-POSITION-MODULATION SYSTEMS

Filed Jan. 16, 1947 3 Sheets-Sheet 2

INVENTOR.
WILSON P. BOOTHROYD
BY
Brown, Denk & Synnestvedt
AGENTS

March 7, 1950 W. P. BOOTHROYD 2,499,844

RECEIVER FOR PULSE-POSITION-MODULATION SYSTEMS

Filed Jan. 16, 1947 3 Sheets-Sheet 3

INVENTOR.
WILSON P. BOOTHROYD
BY
Brown, Denk & Synnestvedt
AGENTS

Patented Mar. 7, 1950

2,499,844

UNITED STATES PATENT OFFICE 2,499,844

RECEIVER FOR PULSE-POSITION-MODULATION SYSTEMS

Wilson P. Boothroyd, Philadelphia, Pa., assignor to Philco Corporation, Philadelphia, Pa., a corporation of Pennsylvania Application January 16, 1947, Serial No. 722,357

20 Claims. (Cl. 179—15)

The invention herein claimed and described provides new and improved receiving means for electrical systems employing time-spaced pulses.

The improved receiving means provided by the present invention may be employed to particular advantage in multi-channel pulse-position modulation microwave communication systems. In this form of system, a series of very short pulses are transmitted in sequence, each of the pulses of the sequential series being a sampled part of a different signal wave, the sequential series being repeated many times per second. By way of illustration, the series may comprise a total of thirty sequential pulses and the series may be repeated at a rate of eight thousand times per second. In such case, the total duration of the series would be 125 $\mu s$ and each of the thirty pulses would occupy a time channel 4.16 $\mu s$ wide. One of the channels is customarily utilized to carry a marker or reference pulse which is used to place and maintain the receiver in synchronism with the transmitter. The pulses in the remaining channels are utilized for carrying as many simultaneous messages as there are channels, and if the system be pulse-position modulated, the position of the individual pulse within the 4.16 $\mu s$ channel varies in accordance with the amplitude of the amplitude-modulated audio signals.

In accordance with the present invention, a new and improved receiving system is provided for receiving the signals transmitted in the multi-channel pulse-position-modulation system. Incorporated in the new receiving system is a specific improvement whereby, in response to the synchronizing pulse or, if desired, in response to all of the pulses of the sequential series, an individual marker pulse is generated for each channel.

While the individual-channel marker pulses may be derived from all of the pulses of the sequential series, as shown in Figure 1 and described in a moment, I prefer to derive the individual-channel marker pulses from the synchronizing pulse alone, as shown in Figure 2, since superior results are thereby obtained.

It is an object of this invention to provide an improved receiving system adapted to function in a multi-channel pulse-position-modulation microwave communication system.

It is another object of this invention to provide improved means, in a receiver of the above type, for locally generating individual marker or reference pulses for each channel, and to provide means for utilizing the individual-channel marker pulses to demodulate the received pulses.

It is a further object of this invention to provide an improved receiving system, for use in a multi-channel pulse-position-modulation system, which includes means for deriving individual-channel marker pulses from the transmitted synchronizing pulse.

These and other objects, advantages and features of the present invention will become clear from a consideration of the following detailed description of illustrative embodiments taken together with the accompanying drawings, in which.

Figure 1:
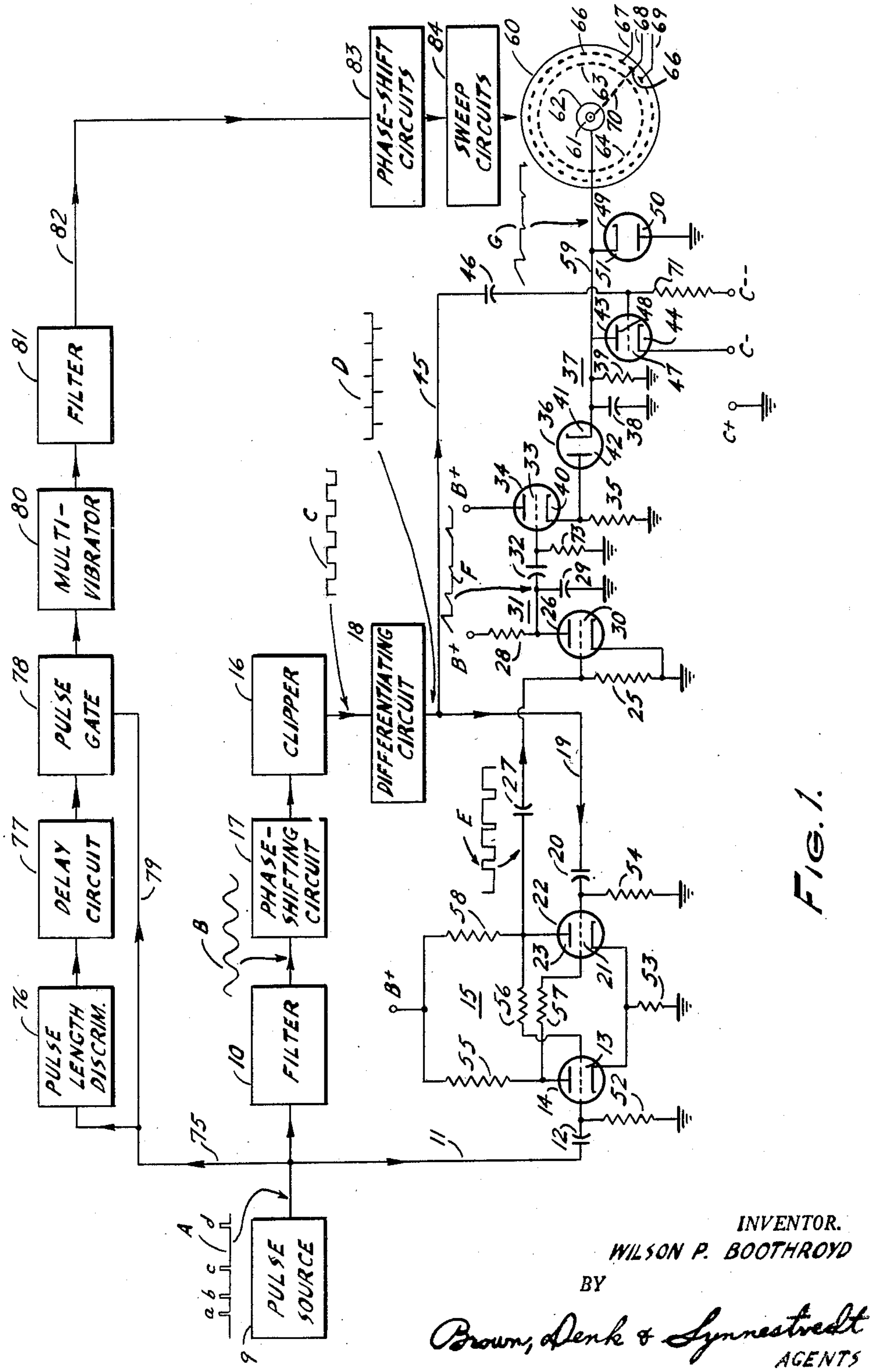
Figure 1 is an illustration, partly diagrammatic, partly schematic, of one form of receiving system embodying the invention.

It will be convenient to first describe the receiving system shown in Figure 1 altho the preferred manner of derivation of individual-channel marker pulses is not incorporated therein. In the system shown in Figure 1, the marker pulses are derived from all of the transmitted pulses and not from the synchronizing pulse alone.

Referring now to Figure 1, there is shown a source 9 of signal wave A comprising time-spaced position-modulated pulses *a*, *b*, *c* and *d*. The spacings between these pulses vary in accordance with the audio modulation, but the amplitudes of the pulses are equal and they are all of like polarity.

Assume that the circuit shown in Figure 1 is employed in a multi-channel position-modulated system and that signal wave A from source 9 is a portion of a sequential series of thirty successive positive pulses which is repeated at an 8 kc. rate, each of the pulses of the sequential series being a sampled part of a different signal wave.

Signal wave A is applied, by way of conductor 11 and capacitor 12, to grid 13 of triode 14 of a non-oscillating multivibrator circuit 15. The purpose and manner of operation of multivibrator circuit 15 will be described in a moment.

Signal wave A is also applied to a filter circuit 10, tuned to the average repetition frequency of the pulses delivered by source 9. In the present illustration, the average pulse-repetition frequency is 240 kc., (i. e. 30×8 kc.) and the 240 kc. sine wave voltage B, shown in Figures 1 and 4, is obtained from signal wave A by means of the tuned filter circuit 10.

Sine wave voltage B delivered by tuned filter 10 is applied to clipper 16 through a phase-shifting circuit 17. The function of circuit 17 is to provide a manual adjustment by means of which the phase of the 240 kc. sine wave B may be adjusted for purposes that will become clear. Circuit 17 may comprise any suitable form of phase-shifting circuit, as for example, a conventional R—C or R—L type of circuit.

Figure 4:
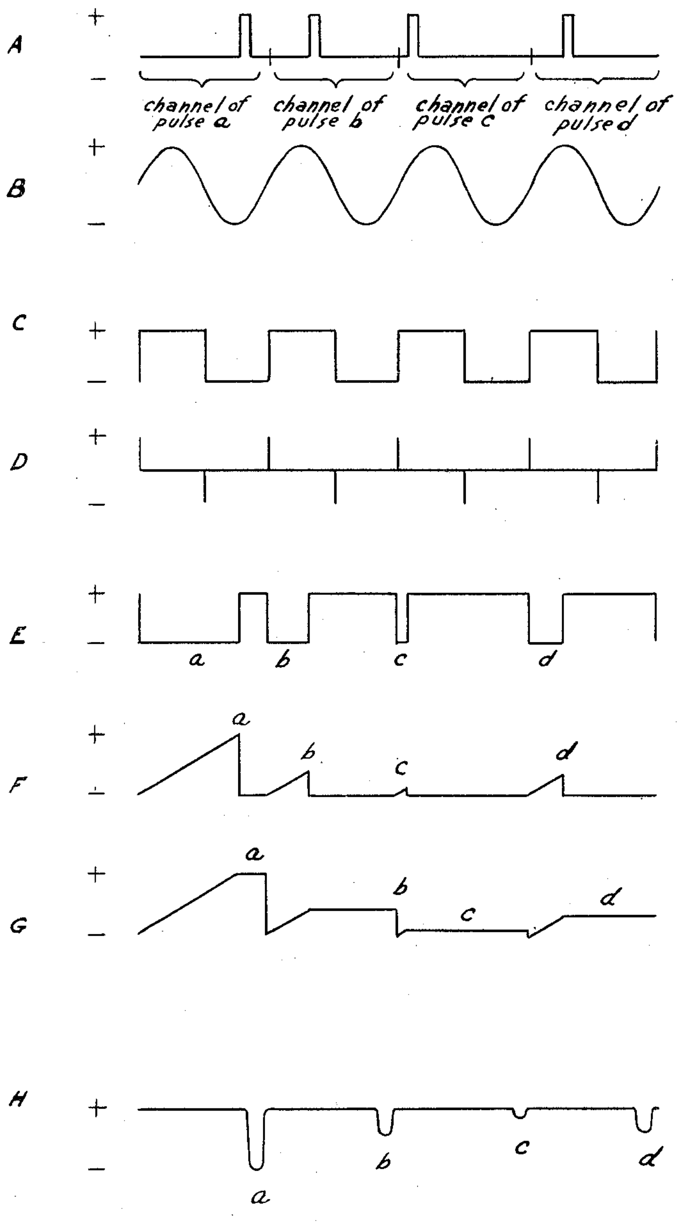
Figure 4 is a representation which shows the time relationship of the various signal waveforms at different points in the receiving system.

Clipper 16 may comprise a double-diode limiter circuit, or any other form of limiter circuit suitable for converting the 240 kc. sine wave voltage into the square wave voltage depicted in Figures 1 and 4 by waveform C.

Square wave voltage C is applied to voltage differentiating network 18 and is therein differentiated to produce the unit pulses depicted in Figures 1 and 4 by waveform D. These unit pulses are commonly referred to as pips or spikes. The occurrence if the positive spikes of waveform D is coincident with the leading edges of the positive pulses of square wave C, as is clearly shown in Figure 4. By properly phasing the sine wave B, as by means of phase-shifting circuit 17, the positive spikes of waveform D may be used to mark the beginnings of the individual time channels; and in the operation of the circuit of Figure 1, the positive spikes of wave D are utilized as channel markers in a manner to be described. In the present illustration the positive spikes are 4.16 μs apart (i. e. one second/240 kc.) and each channel is 4.16 μs wide.

The spikes from differentiating circuit 18 are applied, by way of conductor 19 and coupling capacitor 20, to grid 21 of triode 22. Triode 22 comprises a part of a non-oscillating multivibrator circuit 15 having two stable conditions, in either of which the system is in equilibrium. In addition to triodes 14 and 22, multivibrator circuit 15 includes a number of resistors, 52 to 58 inclusive, connected as shown.

The action of the non-oscillating multivibrator circuit 15 is such that, when the circuit is in either of its two stable conditions, only one of the two tubes passes plate current. The transition of the circuit from one stable condition to the other is very rapid. This action may be briefly described as follows: As triode 22 conducts more and more strongly, in response to the application to its control grid of a positive triggering voltage, triode 14 conducts less and less strongly, until it ceases to conduct. This stable condition now continues until triode 14 is caused to conduct strongly, as by the application of a positive pulse to grid 13, at which time the current through the other tube, triode 22, falls very rapidly to zero. Thus the action of circuit 15 is characterized by sudden triggered reversals from one state of equilibrium to the other. The circuit, which is well known in the art, is commonly referred to as a flip-flop circuit to distinguish it from other non-oscillating multivibrator circuits.

In the circuit of Figure 1, flip-flop circuit 15 is so connected that triode 22 begins to conduct, and triode 14 ceases to conduct, at the instant a positive pulse from differentiator 18 arrives at grid 21 of triode 22. Triode 22 then continues to conduct and triode 14 continues to be non-conductive, until a pulse from source 9 arrives at grid 13 of triode 14, at which time triode 14 conducts and triode 22 ceases to conduct.

It will be observed that when triode 22 is conducting, the potential of plate 23 is less positive by the amount of the voltage drop across resistor 58, and that when tube 22 is not conducting, the full B+ plate voltage appears upon plate 23. Consequently, during operation of the circuit of Figure 1, the voltage on plate 23 and across output load resistors 58 and 25 takes the form depicted by voltage waveform E in Figures 1 and 4. And, as is clearly shown in Figure 4, the leading edge of a negative pulse of waveform E is generated at the instant a positive spike from differentiator 18 arrives at grid 21, and the trailing edge of a negative pulse of waveform E occurs when triode 22 is cut off by the arrival of a positive pulse from source 9 at grid 13 of triode 14.

As previously indicated, the positive spikes from differentiator 18 arrive at grid 21 at regularly spaced intervals, each one marking the beginning of a channel period. But the time of arrival at grid 13 of the position-modulated positive pulses from source 9 varies widely, being in accordance with the audio modulation. Hence, the negative pulses delivered by flip-flop circuit 15 and depicted by waveform E, are pulse-length modulated in conformity with the pulse-position modulation of signal wave A; the longer negative pulses of waveform E are produced by position-modulated pulses of signal wave A which occur later in the channel period.

The pulse-length modulated pulses of waveform E developed at the output of flip-flop circuit 15 are applied to grid 30 of triode 26 by way of coupling capacitor 27. Triode 26, together with resistor 28 and capacitor 29, comprise an integrating circuit 31 which functions to convert pulse-length-modulated waveform E into an amplitude-modulated wave having the shape indicated by voltage waveform F in Figures 1 and 4.

The operation of integrator circuit 31 may be briefly described as follows: When the leading edge of a negative pulse of waveform E, as for example, pulse *a* of waveform E, arrives at grid 30, triode 26 is cut off and the full B+ plate voltage is applied across the series combination of resistor 28 and capacitor 29. The positive voltage across capacitor 29 builds up at a substantially constant rate until the trailing edge of negative pulse *a* of waveform E arrives at grid 30, at which time triode 26 conducts strongly and capacitor 29 discharges very rapidly therethrough. This is depicted in voltage waveform F of Figures 1 and 4. Since the trailing edge of each negative pulse of waveform E corresponds to the arrival of a positive signal pulse from source 9 at grid 13 of triode 14, it will be seen that the magnitude of the positive voltage built up across capacitor 29 is proportional to the time elapsing between the beginning of a channel period and the arrival of a signal pulse belonging to that channel period. Hence, by the means thus far described, the position-modulated pulses of signal wave A have been converted into amplitude-modulated voltages of waveform F. Observe, however, that the peak amplitudes of voltage waveform F occur at irregularly spaced times.

While other means may be employed at this point for effecting segregation of the irregularly spaced amplitude-modulated signals of waveform F into individual-channel circuits, I prefer to use the means described and claimed in the copending application of Thomas A. Sorber, filed Dec. 28, 1946, Serial No. 719,031, assigned to Philco Corporation. In accordance with the means therein described, the signals of the amplitude-modulated voltage waveform F are applied by way of coupling capacitor 32 to grid 33 of cathode-loaded triode 34. Resistor 73 is the usual grid resistor. The output of triode 34 is developed across cathode-load resistor 35 and is applied to a diode 36 whose output network 37 is comprised of a capacitor 38 and resistor 39. The value of resistor 39 is very high and the value of capacitor 38 is large enough to make the R—C time constant of network 37 long in comparison with the time elapsing between channel markers, i. e., long in comparison with the width of the individual channels. If desired, resistor 39 may be completely omitted from the circuit in which case the time constant of capacitor 38 is extremely long irrespective of the value of the capacitor. An extremely long time constant is not disadvantageous, however, as will become clear as the description proceeds.

As the positive voltage, depicted by a pulse of waveform F, builds up across capacitor 29 of integrator circuit 31 in the manner previously described, a corresponding positive voltage builds up across cathode-load resistor 35, since cathode 40 of triode 34 follows the voltage variations impressed upon grid 33. Concurrently then, a similar positive voltage is built up across capacitor 38 of output circuit 37, as cathode 41 follows the rising positive voltage of the signal impressed upon plate 42.

In the absence of means for discharging capacitor 38, the voltage thereacross would represent the peak value of the pulse of greatest amplitude applied to diode 36. For the purpose of discharging capacitor 38 at periodic intervals, there is connected across output network 37 a triode 43, the cathode 44 of which is returned to a point (C—) whose potential is somewhat below ground potential. Triode 43 is normally biased to cut-off, as by means of a negative bias (C— —) applied to control grid 47 by way of resistor 71.

The positive spikes of voltage waveform D developed by differentiator 18, which, as previously described, mark the beginning of the channel periods, are applied by way of conductor 45 and coupling capacitor 46 to grid 47 of triode 43 with the result that triode 43 conducts momentarily each time a positive spike arrives at grid 47. In other words, triode 43 conducts momentarily at the beginning of each channel period.

During the momentary conduction of triode 43, i. e. for the duration of each positive spike of waveform D, the plate resistance of triode 43 drops to a very low value and capacitor 38 discharges rapidly through the triode to ground. In this action, the positive potential of plate 48 of triode 43 drops toward the negative potential (C—) of cathode 44. To prevent plate 48, and hence capacitor 38, from dropping below ground potential, a diode leveler tube 49 may be connected across triode 43, the plate 50 of the diode 49 being connected to ground and the cathode 51 being connected to plate 48 of triode 43. It will be seen that if plate 48 of triode 43 tends to drop below ground potential, cathode 51 will tend to do likewise, and diode 49 will thereupon conduct, thus limiting the negative-potential excursion of conductor 59 to a negligible quantity.

The voltages developed across capacitor 38 take the form depicted as waveform G in Figures 1 and 4. By comparing waveform G with waveform F, the effect of the action of diode 36, long hold network 37, triode 43, and leveler diode 49, may be clearly seen. As has been previously explained, the arrival of a signal pulse from source 9 at grid 13 of triode 14 effects discharge of capacitor 29 of integrator circuit 31 through triode 28. This is clearly represented in waveform F where the rising positive voltage is shown to drop sharply to ground potential coincident with the arrival of a signal pulse. The positive voltage across capacitor 38, however, is not discharged upon the arrival of a signal pulse from source 9 but is maintained by the action of long hold network 37 awaiting arrival of a positive spike from differentiator 18. Upon arrival of such positive spike at grid 47 of triode 43, capacitor 38 discharges rapidly, and this is clearly depicted in waveform G.

Observe that the peak amplitude of each signal of waveform G is extant in each channel just prior to the end of the channel period. Since the end of the channel period occurs at regularly spaced times, the peak amplitude of each successive signal exists at regularly spaced times, and segregation of the signals into individual-channel circuits in sequence may now be readily achieved, as, for example, by means of a radial beam tube. Radial beam tubes of the type required by the system shown in Figure 1 are known in the art and a brief description of a known type will consequently suffice.

In Figure 1, radial beam tube 60 is schematically shown to comprise a cathode 61, a control grid 62, a screening element 63, and a multiplicity of anodes 66. A suppressor grid (not shown) is ordinarily included in the tube structure. Cathode 61 is cylindrical and is positioned vertically in the center of the tube. Control grid 62 is a cylindrical mesh structure closely surrounding cathode 61. Beyond control grid 62 is a multisegment cylindrical screening element 63 having a plurality of narrow apertures or windows 64. Immediately behind each aperture is an anode 66. In the thirty-channel system being described, radial beam tube 60 would have thirty apertures and thirty mutually-insulated anodes. Each anode is connected to one of the individual-channel audio circuits, as by means of a conductor. Only three conductors 67, 68 and 69 are shown in the drawing but these are intended to be representative of the thirty conductors which would be required in the thirty-channel system being described.

Electron beam 70 is a sheet-like beam, focused and rotated in known manner by known means, as by the application of rotating magnetic and/or electrostatic fields. Means for producing and focusing a single sheet-like beam, and for effecting rotation thereof, are shown and described in U. S. Patent No. 2,217,774, issued October 15, 1944 to A. M. Skellett, and are also described in an article by A. M. Skellett entitled "The Magnetically Focused Radial Beam Vacuum Tube" published in the Bell System Technical Journal, April 1944, Volume XXIII, No. 2, pages 190–202. The structure of radial beam tube 60 shown schematically in Figure 1 and briefly described above may, if desired, be similar to the radial beam tube which is fully described in the article just cited.

Electron beam 70 is rotated at a speed of 8000 R. P. S. and its rotation is synchronized with the occurrence of the individual channels of the multi-channel system by means which are illustrated diagrammatically in Figure 1 and which will now be described. To facilitate description of the synchronizing means illustrated, assume that twenty-nine of the channels carry message intelligence in the form of position-modulated pulses of 0.5 μs duration each, and the thirtieth channel carries a synchronizing pulse of 3 μs duration. The position-modulated signals from source 9 are applied by way of conductor 75 to pulse-length discriminator 76 (upper left-hand portion of Fig. 1) which passes only the 3 μs synchronizing pulses and suppresses all the 0.5 μs message intelligence pulses. The synchronizing pulse is then applied to a delay circuit 77 which is arranged, in the present illustration, to deliver an output pulse 124 μs after the application of the synchronizing pulse. If desired, delay circuit 77 may be similar to the circuit shown and described in the copending application of Robert C. Moore, entitled "Pulse delay system," filed April 29, 1944, Serial No. 533,385, now Patent No. 2,479,954, granted August 23, 1949, assigned to Philco Corporation. The delay introduced by circuit 77 between the applied synchronizing pulse and the output pulse is equal to almost one cycle of the 8 kc. frequency, i. e., to almost the length of the synchronizing-pulse repetition period. The delayed pulse from circuit 77 is then applied to pulse gate 78 to open the gate for the succeeding synchronizing pulse which is applied directly to pulse gate 78 by way of conductor 79. Conductor 79 carries message intelligence as well as synchronizing pulses, but only the synchronizing pulses pass through pulse gate 78 since the gate is closed except at synchronizing-pulse time.

The synchronizing pulses pass through gate 78 at a frequency of 8 kc. and in the circuit of Figure 1 are used to synchronize multivibrator 80 at its fundamental frequency. Multivibrator 80 delivers an 8 kc. square wave which is applied to filter 81 to obtain an 8 kc. sine wave and the 8 kc. sine wave is then applied, as by way of conductor 82 and phase-shifting circuits 83, to sweep circuits 84 of radial beam tube 60. The function of sweep circuits 84 is to produce rotating magnetic and/or electrostatic fields whereby rotation of beam 70 at 8000 R. P. S. is effected. Sweep circuits 84 may be of any suitable type and if desired may be similar to those described in the U. S.Patent No. 2,217,774 to A. M. Skellett, mentioned previously.

The function of phase-shifting circuits 83 is to provide a manual adjustment whereby the rotating movement of beam 70 may be so synchronized with the occurrence of the individual channels of the sequential series, as defined by the individual-channel marker pulses previously referred to, that beam 70 sweeps across the anode associated with a particular channel at a time just prior to the end of the channel period.

Referring again to the schematic representation of radial beam tube 60 in Figure 1, it will be understood that, as beam 70 sweeps radially through a complete rotation, the beam electrons pass through each of the thirty apertures in sequence; and in passing through a particular aperture the electrons impinge upon the particular anode located immediately behind that aperture. The beam electrons consequently impinge upon each of the thirty anodes in sequence. For a given speed of rotation, the duration of impingement upon each anode is determined by the width of the beam, the width of the aperture, and the width of the anode. By a proper selection of dimensions, the duration of impingement upon each anode may be made very short, as for example 0.5 μs, and by suitable adjustment of the phase of beam rotation, with respect to the occurrence of the time channels as defined by the individual-channel marker pulses, each anode may be impinged or scanned for 0.5 μs immediately preceding the end of the channel period associated therewith. As each anode is thus scanned, the beam intensity is modulated by the signal then existing on control grid 62 and a corresponding signal is developed in the individual-channel circuit associated with that anode. Waveform H of Figure 4 depicts the signals thus generated sequentially in the individual-channel circuits. And it will be clearly seen from the waveforms of Figure 4 that, by virtue of the action of the long hold circuit comprised of network 37, triode 43 and diodes 36 and 49, the amplitude of the signal on control grid 62 immediately preceding the end of each channel period corresponds to the time position of the pulse transmitted during that channel period.

Figures 2, 3:
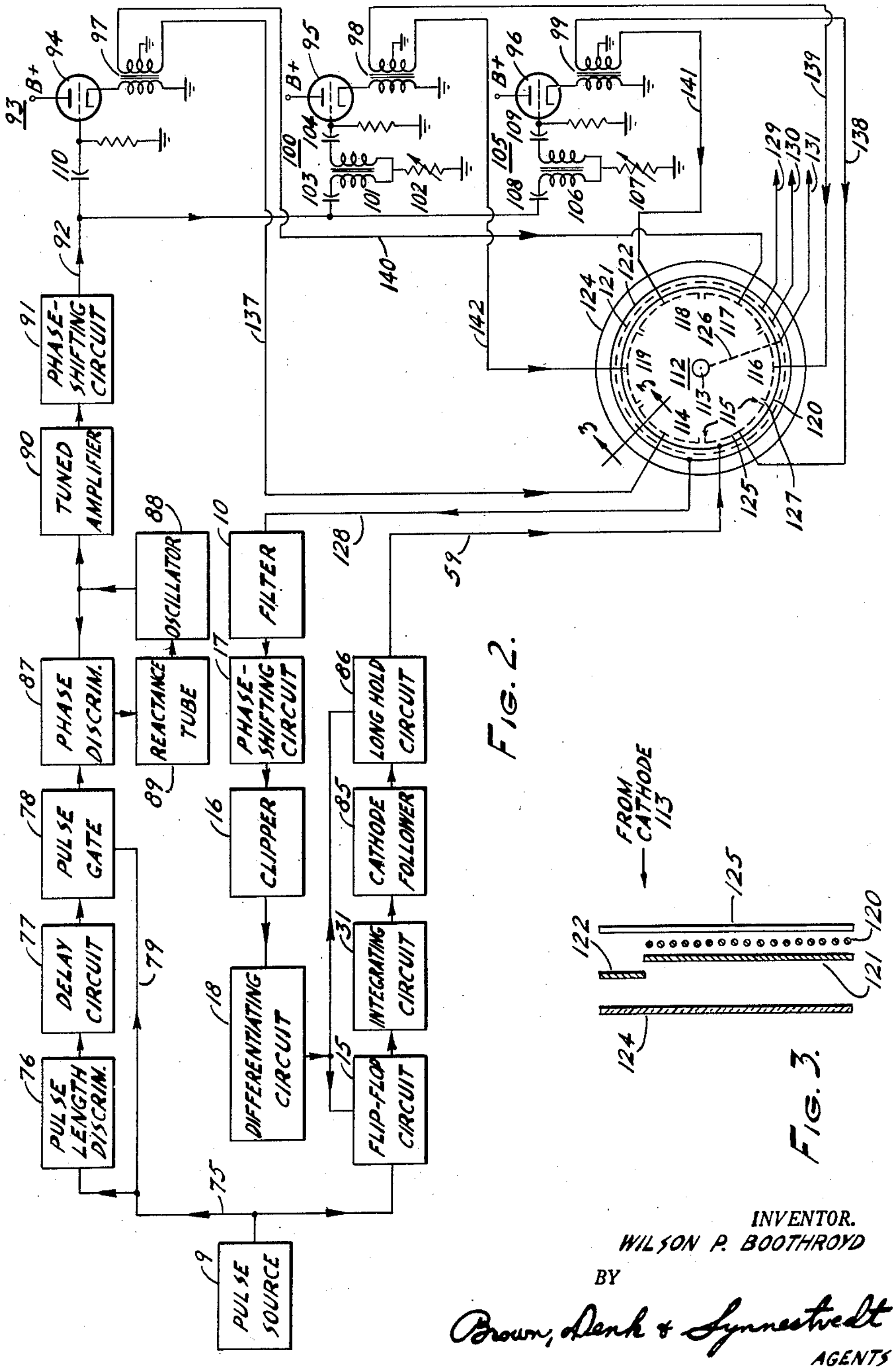
Figure 2 is a representation of a preferred form of receiving system embodying the invention.
Figure 3 is a schematic cross-section along line 3—3 of the radial beam tube shown in Figure 2.

Referring now to Figure 2, there is shown a preferred form of receiving system in which a modified form of radial beam tube 112 is employed in a dual role. One of the functions of radial beam tube 112 is to segregate the multichannel intelligence into individual channel circuits; and this is accomplished in a manner similar to that described above with respect to Figure 1. The other of the functions of radial beam tube 112 is to provide regularly spaced unmodulated pulses at the pulse repetition frequency of the multi-channel system; and it is from the regularly spaced unmodulated pulses delivered by tube 112 that the individual-channel marker pulses are derived, as will be described. The regularly spaced unmodulated pulses delivered by radial beam tube 112 are derived from the synchronizing pulses alone; the modulated message intelligence pulses are not utilized for this derivation. The manner in which the derivation is accomplished will now be described.

In the system of Figure 2, pulse source 9 delivers a composite signal comprising a recurrent series of sequential pulses, one of the pulses of the series being a synchronizing pulse and the others carrying message intelligence. For the purpose of describing the system of Figure 2, it will be assumed that the composition of the sequential series of pulses is similar to that described with respect to Figure 1, i. e. it will be assumed that the series is comprised of 29 message pulses plus one synchronizing pulse, and that the repetition frequency of the series is 8 kc.

The synchronizing pulses are segregated from the other pulses of the series by the combined action of pulse-length-discriminator 76, delay circuit 77 and pulse gate 78 in a manner similar to that described above with respect to Figure 1.

The synchronizing pulses, which in the present illustration pass through pulse gate 78 at an 8 kc. rate, are utilized to control the frequency and phase of a local oscillator 88 which is tuned to the repetition frequency of the synchronizing pulse, i. e., to the repetition frequency of the sequential series of pulses.

It is desired that oscillator 88 deliver an alternating voltage whose frequency is precisely the same as the repetition frequency of the sequential series. If, for example, the series repetition frequency is actually 7.95 kc. instead of 8 kc., then the desired frequency of oscillator 88 is 7.95 kc.; and the synchronizing pulses which pass through pulse gate 78 are utilized to alter the frequency of oscillator 88 from the tuned frequency of 8 kc. to 7.95 kc. This is accomplished by means of phase discriminator 87 in combination with a reactance tube 89. The phase discriminator is a known circuit adapted to recognize differences in frequency and/or phase between two applied voltages. If differences in frequency and/or phase exist, phase discriminator 87 produces a correcting voltage which is applied to the reactance tube 89 which operates to shift the frequency of oscillator 88 in the direction necessary to substantially synchronize the output voltage of oscillator 88 with the synchronizing pulses of the system.

The output voltage of oscillator 88, controlled in frequency and phase as above described, is applied by way of tuned amplifier 90, phase-shifting circuit 91, and conductor 92 to sweep circuits 93 of radial beam tube 112. Phase-shifting circuit 91 provides means whereby manual adjustment of phase may be made as may be required. The alternating voltage available at the output of the device 91 should, of course, closely approximate a sine wave in order to insure rotational beam-sweep at a substantially constant angular velocity.

Sweep circuits 93 are a known form and are shown schematically in Figure 2 as comprising three cathode-loaded triodes 94, 95 and 96. The cathode load of each triode comprises an output transformer whose secondary is center-tapped to ground; hence, the voltages at opposite ends of each secondary are in push-pull relation and are 180° out of phase with respect to each other. The output transformers are identified in Figure 2 by reference numerals 97, 98 and 99.

The sine wave voltage on conductor 92 is applied, by way of coupling capacitor 110, directly to the grid of triode 94; and the voltages at the opposite ends of the secondary of output transformer 97 are consequently in phase with, and 180° out of phase with, the applied sine wave voltage.

The input circuit of cathode-loaded triode 95 includes a known form of R—L phase-shift network 100, comprised of transformer 101 and variable resistance 102. Capacitors 103 and 104 are merely coupling capacitors and do not effect a shift in phase. The resistance of variable resistor 102 is so adjusted, with respect to the inductance value of transformer 101, that a phase shift is achieved across network 100 of such extent that the voltages at opposite ends of the secondary of output transformer 98 are 120° and 300° out of phase with the sine wave voltage on conductor 92.

Phase-shift network 105, in the input circuit of triode 96, is similar to network 100 but is oppositely poled; and variable resistor 107 is so adjusted, with respect to the inductance of transformer 106, that the voltages at opposite ends of the secondary of output transformer 99 are 60° and 240° out of phase with the sine wave voltage on conductor 92. Capacitors 108 and 109 of phase-shift network 105 are merely coupling capacitors.

It will be seen from the above that the sine wave voltages at the six terminals of the three secondary windings of transformers 97, 98 and 99 are 60° apart in phase and these voltages are utilized to effect rotational sweep of beam 126 of radial beam tube 112.

Referring now to radial beam tube 112, there is schematically shown a tube comprised of a cathode 113, six electrostatic deflection plates 114—119, a control grid 120, thirty individual anodes 121, and an annular anode 122, all enclosed within envelope 124.

Cathode 113 is an internally-heated cylindrical electrode placed vertically in the center of the tube. Beyond cathode 113 is a cylindrical deflection structure having a plurality of equi-spaced apertures. This deflection structure is comprised of six mutually-insulated arcuate plates each of which has 4 narrow, vertical windows, uniformly spaced. In Figure 2, the individual arcuate plates are indicated by short radial dashes which mark the extremities of the plates. In addition, plate 115 is clearly indicated by the bracket which is applied thereto. Brackets are omitted from the other five plates in order to avoid undue congestion of lines.

The windows in the deflection plates are identified in Figure 2 by the common reference numeral 125, and the separation space between segments are identified by common numeral 127. The dimensions of the separation spacings are similar to the dimensions of the windows. Windows 125 and separation spaces 127 provide a total of thirty equally-spaced apertures in the cylindrical six-segment deflection plate structure.

Behind the deflection plate structure as viewed from cathode 113 is a cylindrical control grid 120 which may preferably be comprised of thirty individual grids cylindrically arranged and electrically tied together by a common conductor; each of the individual grids is positioned in radial alignment with one of the thirty apertures. Suitable inter-channel shielding means (not shown) may be mounted between the individual grids. The shielding means may for example be in the form of thirty individual vertical rods, electrically tied together, and connected to a source of positive potential.

Immediately behind cylindrical control grid structure 120 are thirty individual anodes, cylindrically arranged. These are identified in Figure 2 by the common reference numeral 121. Each of the individual anodes is in radial alignment with one of the apertures in the deflection plate structure so that electrons passing through an aperture will pass through the individual grid, and impinge upon the individual anode, associated with that aperture.

In accordance with one concept of the present invention, the apertures in the individual deflection plate structure are so positioned, with respect to control grid 120 and individual anodes 121, that a portion of each aperture extends above control grid 120 and above individual anodes 121. A ringlike or annular anode 122 is mounted in back of the cylindrical deflection-plate structure above the individual anodes in such position as to be impinged by electrons which pass through the apertures above grid 120 and anodes 121. This arrangement will be more clearly understood by referring to Figure 3 which is a schematic representation of a cross section of radial beam tube 112 taken along line 3—3.

In Figure 3, annular anode 122 is depicted above control grid 120 and above one of the individual anodes 121, but within the structural limits of one of the windows 125. The upper portion of electron beam 126 passes through window 125, or through separation space 127, and impinges upon annular anode 122 without being appreciably affected by the signal voltage on grid 120. It will be understood, of course, that, if desired, annular anode 122 may be positioned below, instead of above, the control grid and individual anodes.

With respect now to electron beam 126 of radial beam tube 112, cylindrical cathode 113 tends to emit electrons radially in all directions. The path followed by the electrons is controlled, however, by the resultant electrostatic field existing between cathode 113 and deflection plates 114—119. The six out-of-phase sine wave voltages obtaining at the six terminals of the secondaries of transformers 97, 98 and 99, are applied, by way of conductors 137—142, to the six deflection plates 114—119 in such manner that a phase difference of 180° exists between voltages on opposite plates, and a phase difference of 60° exists between voltages on adjacent plates. The resultant deflection force acting upon electrons at all points in the electrostatic field is consequently in the same direction at any instant of time; and this resultant deflection force is rotated at the frequency of the sine wave voltages applied to deflection plates 114—119, which frequency, in the present illustration, is 8 kc.

It is desired that at a given instant substantially all of the electrons emitted by cathode 113 pass through one of the apertures of the deflection-plate structure, and to accomplish this cathode 113 is connected to a source of positive potential which may be adjusted to the value required to cause the direction of motion of all electrons to converge in a vertical line at the deflection plates. Viewed from the top, the electrons of beam 126 form a narrow wedge-shape beam whose tip is located at the deflection plates. And as the electrostatic field established by the six out-of-phase sine wave voltages rotates, beam 126 rotates in a horizontal plane.

The electrons of the upper portion of beam 126, which pass through the upper portion of windows 125 or of separation spaces 127, and strike annular anode 122, generate a series of equally-spaced pulse voltages of substantially equal magnitude on anode 122 whose repetition frequency is equal to the number of apertures in the deflection-plate structure multiplied by the rotational speed of the beam, which in the present illustration is 240 kc. (i. e. 30×8 kc.).

The voltages thus generated on annular anode 122 are applied by way of conductor 128 to a filter circuit 10, tuned in the present illustration to 240 kc.: and the 240 kc. sine wave output voltage of filter circuit 10 is applied to a phase-shifting circuit 17 which provides a means of manually adjusting the phase of the sine wave, as may be required. The output of phase-shifting circuit 17 is applied to a clipper circuit 16, and the square wave thus produced is applied to differentiating circuit 18.

Components 10, 17, 16 and 18 referred to above, as well as other components of Figure 2 not thus far referred to, are similar in function and in operation to components bearing like reference numerals in the receiving system of Figure 1. Flip-flop circuit 15 and integrating circuit 31 of Figure 1 are shown in Figure 2 in block form. The cathode-follower stage of Figure 1, comprising triode 34, cathode-load resistor 35 and grid resistor 73, are shown in block form in Figure 2 identified by reference numeral 85. That portion of Figure 1 comprising diode 36, network 37, triode 43 and diode 49, are shown in block form in Figure 2 identified as long-hold circuit 86.

In Figure 2, sequential amplitude-modulated output signals are delivered by long-hold circuit 86 in a manner similar to that described with respect to Figure 1, and are applied by way of conductor 59 to grid 120 of radial beam tube 112. In radial beam tube 112, the sequential signals are sorted into the thirty individual-channel circuits associated with the thirty individual anodes 121, the sorting action of tube 112 being similar to that described in connection with tube 60 of Figure 1. In Figure 2, conductors 129, 130 and 131 are representative of the individual-channel circuits.

In the description previously given of radial beam tube 112, the windows in the deflection plates and the separation spaces between adjacent deflection plates were assumed to be of such vertical length that at the time the upper portion of the electron beam passed through the upper portion of the window or space to strike annular anode 122 the lower portion of the electron beam passed through the lower portion of the same aperture to strike one of the individual anodes 121. It will be noted that if this construction be employed, the electron beam will strike both the annular anode 122 and an individual anode 121 at substantially the same instant of time; and it is the function of phase-shifting circuit 17 to delay slightly the 240 kc. sine wave passing through filter circuit 10 derived from the equally-spaced unmodulated pulses generated in annular anode 122, as otherwise the individual-channel marker pulses will occur substantially coincident with the occurrence of sampling and sorting.

Alternatively, the deflection plates of the radial beam tube may be constructed to include separate apertures for the electrons which are intended to impinge upon annular ring 122. Such separate windows may be extremely narrow in width and slightly offset in the direction of beam rotation from the apertures intended for the electrons which impinge upon the individual anodes 121. If separate windows, as just described, be employed, then components 10, 17 and 16 may be omitted from the system and the pulses developed on annular ring 122 may be applied directly to discriminator 18.

I have described several embodiments of an improved receiving system adapted for employment in multi-channel pulse-position-modulation systems, and I have described several means for locally generating individual-channel marker pulses. Other embodiments, not involving invention, will occur to those skilled in the art.

Having described my invention, I claim:

1. A receiver in a multi-channel pulse-position-modulation system comprising: a source of a recurrent series of sequential time-spaced position-modulated pulses of substantially equal amplitude, each of said pulses of said series being a component of a different wave and occupying a position within one channel of a sequential series of channels of equal time duration; means responsive to at least certain of said pulses for deriving a square wave whose frequency is equal to the number of said channels in said sequential series multiplied by the repetition frequency of said series; means for so phasing said square wave that a cycle thereof corresponds to a channel of said sequential series; means responsive to said square wave for deriving successive unit marker pulses defining the limits of successive channels; means responsive to said time-spaced pulses of said sequential series and also to said marker pulses for deriving sequential length-modulated pulses whose lengths correspond to the positions of said time-spaced pulses within said channels; means for converting said sequential length-modulated pulses into sequential amplitude-modulated signals of corresponding amplitudes; and means for sorting said sequential amplitude-modulated signals sequentially into individual circuits.

2. A receiver as claimed in claim 1, characterized in that said series of sequential time-spaced pulses includes a synchronizing pulse, and further characterized in that said means for deriving said square wave is responsive to said synchronizing pulse.

3. A receiver as claimed in claim 1, characterized in that said series of sequential time-spaced pulses includes a synchronizing pulse, and further characterized in that said means for sorting said sequential amplitude-modulated signals sequentially into individual circuits comprises means responsive to said synchronizing pulse.

4. A receiver as claimed in claim 1, characterized in that said means for deriving said square wave is responsive to all of said pulses of said sequential series.

5. A receiver as claimed in claim 1, characterized in that said series of sequential time-spaced pulses includes a synchronizing pulse, and further characterized in that said means for deriving said square wave includes a radial beam tube, the beam of which is driven by potentials which are responsive to said synchronizing pulse.

6. A receiver as claimed in claim 1, characterized in that said series of sequential pulses includes a synchronizing pulse, further characterized in that said means for deriving said square wave includes a radial beam tube, the beam-driving potentials of which are responsive to said synchronizing pulse, and further characterized in that said means for sorting said sequential amplitude-modulated signals sequentially into individual circuits comprises said radial beam tube.

7. A receiver as claimed in claim 1, characterized in that said means for deriving a square wave comprises means responsive to all of the pulses of said sequential series for deriving a sine wave whose frequency is equal to the number of said channels in said sequential series multiplied by the repetition frequency of said series, and means for converting said sine wave into said square wave.

8. A receiver as claimed in claim 1, characterized in that said means for converting said sequential length-modulated pulses into sequential amplitude-modulated signals comprises an integrating circuit.

9. A receiver as claimed in claim 1, characterized in that said series of sequential time-spaced pulses includes a synchronizing pulse, further characterized in that said means for deriving said square wave includes a radial beam tube having a beam rotatively driven by potentials responsive to said synchronizing pulse, and still further characterized in that said means for sorting said sequential amplitude-modulated signals sequentially into individual circuits includes means for utilizing a portion of said beam of said radial beam tube.

10. A receiver as claimed in claim 1, characterized in that said means for deriving sequential length-modulated pulses whose lengths correspond to the positions of said time-spaced pulses within said channels comprises a flip-flop circuit.

11. A receiver in a multi-channel pulse-position-modulation system comprising: a source of a recurrent series of sequential time-spaced position-modulated pulses of substantially equal amplitudes, the pulses of said series being components of different interrupted waves, the spacings between said pulses varying in accordance with the applied audio modulation, each of said pulses occupying a position within one channel of a sequential series of channels of equal time duration; means responsive to at least certain of said sequential pulses for deriving a square wave whose frequency is substantially fixed and equal to the average frequency of said pulses; means for so phasing said square wave that a cycle thereof corresponds to a channel of said sequential series; means responsive to said square wave for deriving successive unit marker pulses defining the limits of successive channels; means for utilizing said marker pulses to convert the sequential pulses of said source into sequential pulse-length modulated pulses; means for integrating said sequential pulse-length-modulated pulses to obtain sequential time-spaced amplitude-modulated signals; and means for distributing said sequential amplitude-modulated signals sequentially into individual circuits.

12. A receiver as claimed in claim 11, characterized in that said means for utilizing said marker pulses to convert the sequential pulses of said source into sequential pulse-length-modulated pulses comprises a flip-flop circuit.

13. A receiver as claimed in claim 11, characterized in that said series of sequential pulses includes a synchronizing pulse, further characterized in that said means for deriving said square wave is responsive to said synchronizing pulse, and still further characterized in that said means for distributing said sequential amplitude-modulated signals sequentially into individual circuits comprises a radial beam tube whose beam is rotated by potentials responsive to said synchronizing pulse.

14. A receiver as claimed in claim 11, characterized in that said series of sequential pulses includes a synchronizing pulse, and further characterized in that said means for deriving said square wave includes a radial beam tube having a beam rotatively driven by potentials responsive to said synchronizing pulse.

15. A receiver as claimed in claim 11, characterized in that said series of sequential pulses includes a synchronizing pulse, and further characterized in that the means for distributing said sequential amplitude-modulated signals into individual circuits comprises a radial beam tube, the beam-driving potentials of which are responsive to said synchronizing pulse.

16. A receiver as claimed in claim 11, characterized in that said series of sequential pulses includes a synchronizing pulse, further characterized in that said means for deriving said square wave includes a radial beam tube having a beam rotatively driven by potentials responsive to said synchronizing pulse, and further characterized in that said means for distributing said sequential amplitude-modulated signals sequentially into individual circuits includes means for utilizing a portion of said beam of said radial beam tube.

17. A receiver as claimed in claim 11, characterized in that said means for deriving said square wave is responsive to all of said pulses of said sequential series.

18. In a multi-channel pulse-position-modulation receiver; a source of a recurrent sequential series of successive pulses of substantially equal amplitude, said pulses of said sequential series being components of different signal waves and being position-modulated within individual channels of a sequential series of channels of equal time duration; means for deriving from all of said pulses a square wave whose frequency is substantially fixed and equal to the average frequency of said pulses; means for so phasing said square wave that a cycle thereof corresponds to a channel of said sequential series; and means responsive to said square wave for deriving unit pulses defining channel limits.

19. In a receiver adapted for use in a multichannel pulse-position-modulation system: a source of a recurrent series of sequential position-modulated pulses of substantially equal amplitude, said series including intelligence pulses and a synchronizing pulse, the intelligence pulses of said series being components of different interrupted waves, each of said pulses occupying a position within one channel of a sequential series of channels of equal time duration; means responsive to said synchronizing pulse of said sequential series for generating a sine wave whose frequency is substantially fixed and equal to the number of channels in said sequential series multiplied by the repetition frequency of said series; means for adjusting the phase of said sine wave so that a cycle of said sine wave corresponds to a channel of said series; means for converting said sine wave into a square wave; and means for differentiating said square wave to obtain unit pulses marking the limits of said channels.

20. A receiver in a multi-channel system comprising: a source of a recurrent series of sequential time-spaced position-modulated pulses of substantially equal amplitude, said series including intelligence pulses and a synchronizing pulse, each of said intelligence pulses of said series being a component of a different wave and occupying a position within one channel of a sequential series of time channels; means, including a radial-beam tube the beam-driving potentials of which are responsive to said synchronizing pulse, for deriving unit marker pulses defining the limits of said channels; means responsive to said time-spaced pulses of said sequential series and also to said marker pulses for deriving sequential signals whose amplitudes correspond to the positions of said pulses within said channels; and means for segregating said signals into individual circuits.

WILSON P. BOOTHROYD.

REFERENCES CITED

The following references are of record in the file of this patent:

UNITED STATES PATENTS

| Number | Name | Date |
|---|---|---|
| 1,928,093 | Coyle | Sept. 26, 1933 |
| 2,185,693 | Mertz | Jan. 2, 1940 |
| 2,262,838 | Deloraine | Nov. 18, 1941 |
| 2,263,369 | Skillman | Nov. 18, 1941 |
| 2,265,216 | Wolf | Dec. 9, 1941 |
| 2,272,070 | Reeves | Feb. 3, 1942 |
| 2,277,516 | Henroteau | Mar. 24, 1942 |
| 2,391,776 | Fredendall | Dec. 25, 1945 |
| 2,403,210 | Butement | July 2, 1946 |
| 2,413,023 | Young | Dec. 24, 1946 |
| 2,416,305 | Grieg | Feb. 25, 1947 |
| 2,416,330 | Labin et al. | Feb. 25, 1947 |
| 2,418,127 | Labin | Apr. 1, 1947 |
| 2,426,205 | Grieg | Aug. 26, 1947 |

FOREIGN PATENTS

| Number | Country | Date |
|---|---|---|
| 587,942 | Great Britain | May 9, 1947 |